United States Patent [19]
Lee

[11] 3,871,383
[45] Mar. 18, 1975

[54] POWER SUPPLY
[75] Inventor: Jin W. Lee, North Miami, Fla.
[73] Assignee: Medcor Inc.
[22] Filed: Sept. 25, 1973
[21] Appl. No.: 400,503

[52] U.S. Cl............................. 128/419 PS, 307/71
[51] Int. Cl............................................. A61n 1/36
[58] Field of Search....... 128/419 P, 419 PS, 419 R, 128/421, 422, 423; 307/46, 48, 51, 60, 71, 87, 297; 320/16, 33

[56] References Cited
UNITED STATES PATENTS
3,748,500   7/1973   Tam ................................. 128/419 P
3,756,245   9/1973   Thaler et al. ..................... 128/419 P FOREIGN PATENTS OR APPLICATIONS
474,271   8/1969   Switzerland ..................... 128/419 P Primary Examiner—William E. Kamm

[57] ABSTRACT

A redundant power supply for a body organ stimulating device having at least two parallel branches. Circuit means are provided which are operatively connected to the output terminals of the power supply and to each parallel branch thereof and are responsive to the voltage across the output terminals of the power supply falling to a predetermined value for automatically serially interconnecting the power sources of the power supply.

7 Claims, 4 Drawing Figures

POWER SUPPLY

BACKGROUND OF THE INVENTION

1. Field of the Invention

This invention relates generally to pulse generating devices such as electronic body organ stimulating apparatus. More particularly, the present invention relates to pulse generating devices employing a novel redundant power source for improved reliability. The invention will here be described in more detail in association with a battery powered electronic heart-beat stimulation apparatus or cardiac pacer since the apparatus according to the invention has been particularly developed, for use with such pacers. The power supply of the invention, however, may be used in other pulse generating devices. It might perhaps be used in conjunction with electronic stimulators for the brain, bladder and other body organs as well, and with pacers other than the type hereinafter described without departing from the scope of the invention.

2. Description of the Prior Art

Over the past 10 years or so electronic cardiac pacing has become the standard mode of therapy for providing artificial stimulation to a patient's heart to induce a heartbeat. Heart pacers are now routinely implanted in the body of the patient along with the power sources, generally batteries, for powering the pacer.

While the batteries used in implantable cardiac pacers are constructed with extreme care so as to insure long life and maximum reliability, they, at times, fail after an unpredictable or random period of operation and, of course, become depleted in normal operation.

Because battery failure or premature battery exhaustion has been determined to be the principal cause of failure in cardiac pacers, it has become desirable to use several batteries connected in a parallel redundant configuration as the pacer power source. As for example, a power supply having two parallel, branches with each branch having disposed therein two cells connected in series is shown in my prior U.S. patent application Ser. No. 241,577, filed Apr. 6, 1972, now U.S. Pat. No. 3,789,854.

It should be pointed out here that there is a major disadvantage of using redundant batteries as a power source unless there is some provision in the power supply or pacer electronics to give and outward indication of premature battery failure. It may be explained here that in pacers having a battery comprised of a plurality of series connected cells, the usual indication of battery failure is a change in pulse rate as pulse rate in such pacers is generally proportional to battery terminal voltage. However, with a two battery redundant system, for example, a pacer could be operating on one half power shortly after implantation if a battery of one parallel branch fails with no outward indication to either patient or attending physician because the terminal voltage of the other parallel branch is by design adequate to normal functioning of the pacer electronics. That is, even with one of the batteries fully depleted, the terminal voltage of the remaining parallel branch will insure proper operation of the pacer.

The danger of this situation is obvious since it is assumed that after pacer implantation the pacer will operate safely for a predicted period of time when, in fact, in the example given, in only one half or less of that time the pacer will certainly fail.

In order to avoid the just described disadvantage, the above identified application provides apparatus to determine indirectly the status of the batteries of the power supply making up the redundant battery power supply of the pacer. The apparatus and mode of operation to indirectly determine the status of the batteries of the power supply in that application required the use of a permanent magnet to effect operation of a switch contained in the pacer which switch, when operated, effected serial connection of the normally parallel connected batteries. In this manner, accurate evaluation of battery conditions cauld be made indirectly.

Another advantage disclosed in said application is that should there be a single cell failure in both parallel branches of the power supply, the continuous use of a permanent magnet to effect operation of the switch would serially interconnect the remaining cells in each parallel branch to maintain pacer operation.

For further advantages of the invention disclosed in the above identified application, the reader is referred thereto. The present invention is an improvement in the power supply of the type disclosed in the above identified application.

SUMMARY OF THE INVENTION

In accordance with the present invention, a power supply is provided comprising at least two parallel branches with each parallel branch having disposed therein at least one electrical power source. Circuit means are provided that are operatively connected to the output terminals of the power supply and to each parallel branch thereof. The circuit means are responsive to the voltage across the output terminals of the power supply falling to a predetermined value for automatically serially interconnecting the electrical power sources.

The circuit means include a circuit component operatively connected to each parallel branch of the power supply and having a variable impedance, and voltage sensing circuitry operatively connected to the output terminals of the power supply and to the variable impedance circuit component. The voltage sensing circuitry is operative in response to a predetermined voltage being sensed thereby to interconnect the power sources of each parallel branch of the power supply in series by varying the impedance of the variable impedance circuit component in accordance with the voltage sensed thereby. The arrangement is such that the voltage across the output terminals of the power supply is maintained at a constant voltage substantially equal to the sum of the voltage appearing across each electrical power source minus the voltage drop across the variable impedance circuit component.

In this manner, in a power supply having two parallel branches with a pair of series connected batteries in each parallel branch, for example, upon detection of cell failure on both pairs of batteries, the present invention provides circuit means for automatically connecting the two pairs of batteries in series with a predetermined output voltage appearing and being maintained across the output terminals of the power supply. In this mode of operation, the output pulse rate of a pacer connected to the power supply of the invention will be at a substantially lower value than in the normal mode wherein the two pairs of batteries are connected in parallel. The automatic series interconnection of the batteries of the power supply of the invention, therefore, provides a definite warning for pacer replacement and, at the same time, yields maximum warning time for pacer replacement by utilizing the maximum energy available from the batteries making up the power supply.

A more complete understanding of the invention will become apparent from the following description, taken in conjunction with the accompanying drawing which form a part of this specification.

BRIEF DESCRIPTION OF THE DRAWINGS

FIG. 3 illustrates the electronic pacer of FIG. 1 rate behavior for:

a. Operation in the normal energy depletion mode,
 b. A single cell failure on one pair and second cell failure or depleting on the remaining pair; and
 c. A single cell failure on both pairs of batteries.

Figure 1:
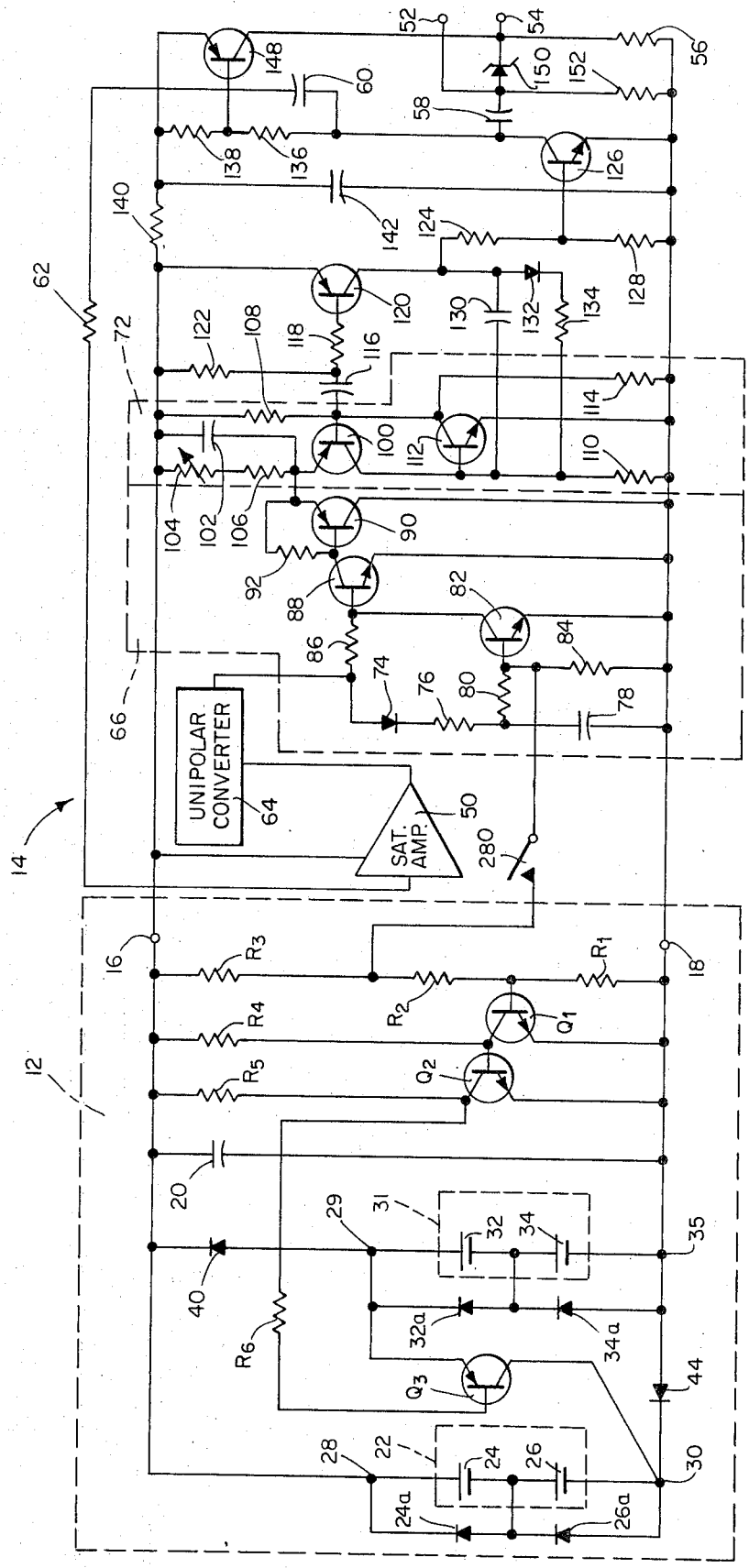
FIG. 1 is a partial block and partial schematic diagram of a power supply in accordance with the invention and an electronic pacer for use therewith.
Figure 4:
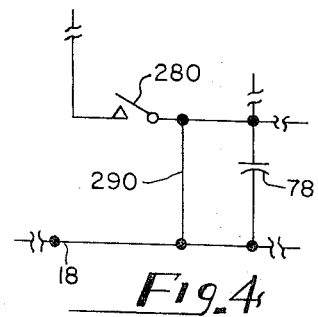

FIG. 4 illustrates a portion of FIG. 1 and shows an alternate embodiment of the invention.

DETAILED DESCRIPTION OF THE PREFERRED EMBODIMENT

Referring now to FIG. 1, there is shown in partial block and partial schematic diagram a cardiac pacer according to the invention having a power supply 12 for providing electrical excitation to the electronic cardiac pacer 14. Referring to the power source 12, first and second output terminals 16 and 18 are provided from which the power is taken to energize the pacer 14. The output terminals 16 and 18 have connected thereacross a filtering capacitor 20. A first battery 22 is composed of series connected cells 24 and 26 and has the positive terminal 28 thereof connected to the terminal 16. The negative terminal 30 of the battery 22 is connected through diode 44 to the terminal 18. The negative terminal 30 of the battery 22 is also connected through transistor $Q_3$ to the positive terminal 29 of a second battery 31 comprised of series connected cells 32 and 34. The negative terminal 35 of the battery 31 is connected to the terminal 18 and the positive terminal 29 of battery 31 is connected through diode 40 to terminal 16.

Diodes 24a, 26a, 32a and 34a are connected respectively across batteries 24, 26, 32 and 34 respectively. These diodes are reverse biased when each battery is normally charged, but permit current by-passing of a failed battery when it has failed in an open circuited condition. Moreover, the diode connection prevents battery reverse polarization as has been known to occur in damaged batteries.

In a manner to be explained more fully below, the transistor $Q_3$ is operable in response to a predetermined voltage appearing across the terminals 16 and 18 to interconnect the negative terminal 30 of battery 22 to the positive terminal 29 of battery 31.

As can be seen, when the terminals 30 and 29 are connected through transistor $Q_3$ to each other, the batteries 22 and 31 will be connected in series across the output terminals 16 and 18. Assuming for the moment that there's substantially a zero voltage drop across transistor $Q_3$, then there will be provided a voltage between terminals 16 and 18 equal to four times the normal voltage of each cell. This voltage is normally at least twice the level necessary to cause artificial cardiac stimulation and thus in the normal course, when transistor $Q_3$ is not functioning to interconnect the batteries 22 and 31 in series, i.e., an effective open circuit between terminals 30 and 29, the batteries 22 and 31 are provided as redundant electrical power sources connected in parallel across the terminals 16 and 18 for jointly energizing the power input terminals of the pacer 14.

A more detailed structural and functional description of the power supply 12 will now be given. Voltage across terminals 16 and 18 is provided through the following paths:

1. from terminal 18 thru cells 34 and 32, thru diode 40 to terminal 16;
 2. from terminal 18 thru diode 44 and cells 26 and 24 to terminal 16; and
 3. from terminal 18 through cells 34 and 32, transistor $Q_3$ and cells 26 and 24 to terminal 16.

Energy for the pacer electronics 14 is supplied thru terminals 16–18 from paths 1 and 2 defined above when the cells are normal. Controlled conduction of transistor $Q_3$, as will be explained hereinafter, through circuitries comprising transistors $Q_1$ and $Q_2$ or through switch 28 determines the final voltage appearing across terminals 18-16 upon cell failures or energy depletion as the cells approach the end of life.

In operation, the voltage furnished to the base terminal of transistor $Q_1$ is set above the base-emitter junction voltage ($V_{be}$) of transistor $Q_1$ via a divider network comprising resistors $R_1$, $R_2$, and $R_3$, to assure conduction of transistor $Q_1$ when the terminal voltage of the power supply 12 is at the nominal value. Since transistor $Q_1$ is fully on, the base of the transistor $Q_2$ is nearly at ground potential. Therefore, transistor $Q_2$ is non-conducting and the voltage across the collector of transistor $Q_2$, or the base of transistor $Q_3$, is at the potential of terminal 16. Since both the base and emitter of transistor $Q_3$ are at approximately the same potential, transistor $Q_3$ will be non-conducting and the series connection between the two batteries 22 and 31 will be opened. However, when the voltage across terminals 18-16 drops to a point where $$\frac{(E_{18-16}) R_1}{R_1+R_2+R_3}$$

is slightly less than the $V_{be}$ of transistor $Q_1$, $Q_1$ becomes less conductive and the voltage at the collector of transistor $Q_1$ or base of transistor $Q_2$ rises. When this voltage exceeds $V_{be}$ of transistor $Q_2$, transistor $Q_2$ goes into conduction thus allowing base current from transistor $Q_3$ thru resistor $R_6$ and transistor $Q_2$. Conduction of transistor $Q_3$ back-biases diode 44 thus allowing cells 34-32 and 26-24 to be connected in series with an impedance dependent upon its base current; thus the voltage across terminals 16–18 is automatically maintained at a constant value less than the two cell voltages E34-E32 or E26-E24 to satisfy the requirements that $$\frac{(E_{18-16}) R_1}{R_1+R_2+R_3}$$

is equal $V_{be}$ of transistor $Q_1$. The base-emitter diode voltage of transistor $Q_1$ is then in fact serving as a reference voltage for the voltage regulating circuit or loop comprising transistors $Q_1$, $Q_2$, $Q_3$ and their associated components. Thus, the regulating loop is not operative when all the cells in the power source are at normal voltage, as for example 1.35 volts each. The regulating circuit becomes operative only when the voltage across terminals 18-16 falls below the value defined by $$\frac{(R_1 + R_2 + R_3) V_{be}}{R_1}$$

and maintains it at this level until the source voltage falls below this value.

From the foregoing, it will be understood to those skilled in the art that transistor $Q_3$ is a circuit component having a variable impedance and acts like a variable resistor automatically controlled by its base current which is proportional to the voltage developed across terminals 18-16. The transistors $Q_1$ and $Q_2$ and their associated components comprise a voltage sensing circuit for continuously sensing the voltage across the output terminals 18-16 of the power supply. The voltage sensing circuit is responsive to the voltage across the output terminals of the power supply falling to a predetermined value to continuously vary the impedance of the transistor $Q_3$ thereby serially interconnecting the batteries 22 and 31 in a manner such that the output terminals 18-16 are continuously supplied with a voltage substantially equal to the sum of the voltages appearing across each battery minus the voltage drop across the transistor $Q_3$.

To understand further the functioning of these features references will be made to the electronics contained within the cardiac pacer 14, these being similar to those shown in my copending United States patent application mentioned above and application Ser. No. 78,659, filed Oct. 7, 1970 for CARDIAC-AUTOPACER, now U.S. Pat. No. 3,759,266.

Figure 2:
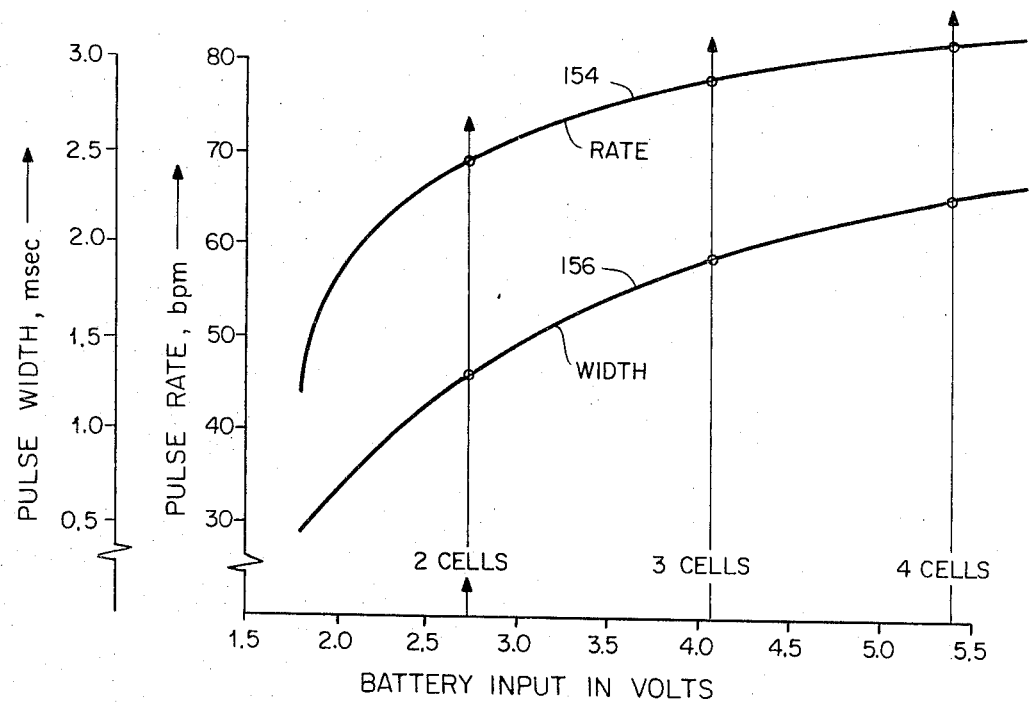
FIG. 2 illustrates the pulse rate and pulse duration of the electronic pacer of FIG. 1 with the various conditions of the cells in the power source in the test mode of operation.

Within the pacer 14 an amplifier 50 receives as its input a signal from electrodes 52 and 54 connected to body and heart tissue at points known in the art to receive body signals representative of ventricular contractions within the heart. A resistance 56 connects electrode 54 to circuit ground provided at terminal 18, and capacitors 58 and 60 and series resistor 62 connect electrode 52 into the amplifier 50. Amplifier 50 is preferably of a saturating design indicated in my above-referenced United States patent application Ser. No. 78,659 as amplifier 26 in FIG. 2. The output of the amplifier 50 is provided to a regenerative unipolar converter 64 also of design similar to that indicated in my above-referenced United States patent application Ser. No. 78,659 as element 32. The converter 64 responds to transitions or pulses from the amplifier 50 to convert them into single polarity impulses, the ventricular contraction signals applied to the amplifier 50 being known to occur unpredictably in either polarity. The output of the converter 64 is applied to a stabilized reset trigger 66 whose function is to inhibit the pulses from the converter 64 to a pulse generator 72 until a predetermined, refractory interval has elapsed since the last output from the converter 64.

Within the reset trigger 66, the output of converter 64 is conducted through a diode 74, resistor 76, and capacitor 78 to terminal 18. From the junction between resistor 76 and capacitor 78, a resistor 80 leads to the base of a grounded emitter NPN transistor 82 and thence through a resistor 84 to ground terminal 18. The output of the unipolar converter 64 is also supplied through a resistor 86 to the base of a grounded emitter NPN transistor 88 and collector of transistor 82. The collector of transistor 88 is applied to the base of PNP transistor 90. The collector and emitter of transistor 82 are respectively applied to the base of transistor 88 and, through a resistor 92, to the collector of transistor 88. The collector of transistor 90 is returned to terminal 18.

In operation, each pulse produced at the output of converter 64 is effective to charge and recharge capacitor 78 thus holding transistor 82 in conduction for a predetermined refractory interval. While transistor 82 conducts, transistor 88 is inhibited from conducting and generating a reset of pulse generator 72. When transistor 82 is not conducting, pulses from converter 64 trigger transistor 88 and transistor 90 to cause resetting of generator 72.

The output of the circuit 66 is applied in pulse generator circuit 72 into the emitter of a PNP transistor 100. The emitter of transistor 100 is also connected to terminal 16 through a capacitor 102 functioning as the pulse interval timing capacitor and also through series variable and fixed resistors 104 and 106 respectively. The base of transistor 100 is connected to terminal 16 through a resistor 108 while its collector is connected to terminal 18 through a resistor 110. The base of transistor 100 is also connected to the collector of an NPN transistor 112. Transistor 112 has its emitter connected to terminal 18 and its base connected to the collector of transistor 100. A further resistor 114 is connected between the collector of transistor 112 and terminal 18. The pulse generator 72 is a regenerative circuit using the discharge and charge time constants of the capacitor 102 to provide pulse interval timing as indicated in my referenced United States patent application Ser. No. 78,659.

The signal at the base of transistor 100 is applied through a capacitor 116 and resistor 118 into the base of a PNP transistor 120, the base thereof being biased through a resistor 122 to terminal 16 and its emitter being connected directly to the terminal 16. The collector of transistor 120 is connected through a resistance 124 to the base of a grounded emitter NPN transistor 126 and through a series resistor 128, to ground terminal 18. The collector of transistor 120 also provides a feedback signal through a capacitor 130 in parallel with a series combination of a diode 132 and resistor 134 to the base of transistor 112 thus providing a stabilized pulse width at the collector of transistor 120 independent of load.

The collector of transistor 126 applies the artificial stimulating pulse through capacitor 58, acting as a voltage doubling capacitor, to the electrode 52. That collector is also connected through series resistances 136 and 138 from a voltage dropping register 140 connected to terminal 16. Connecting the low side of resistor 140 to terminal 18 is a storage capacitor 142. The low side of resistor 140 is also connected through the emitter-collector junction of a PNP transistor 148 to the electrode 54. The base of transistor 148 is biased from the junction of resistors 136 and 138. A Zener diode 150 protects against excessive voltage across electrodes 52 and 54 resulting from any defibrittating action, and balancing resistor 152 connects electrode 52 to terminal 18.

As indicated in my above-identified United States patent application Ser. No. 78,659, the pulse generated and appearing at the base of transistor 100 is applied through transistor 120 for width determination by capacitor 116 and resistors 118 and 122 and for application to the voltage doubling circuit employing transistors 126 and 148. It also is applied in a regulating feedback configuration through capacitor 130, diode 132 and resistor 134 to the base of transistor 112 to regulate the pulse width and interval independent of load on the electrodes 52 and 54. The transistors 126 and 148 operate in response to a pulse from the collector of transistor 120 to connect capacitor 58 in series with the voltage across terminals 16 and 18 to the electrodes 52 and 54. When that voltage between the terminals 16 and 18 is the normal voltage resulting from the parallel redundant configuration with the transistor $Q_3$ effectively in an open condition a normal pulse amplitude and interval will be achieved.

Still referring to FIG. 1, a normally open magnetic reed switch 280 is connected between the junction of resistors $R_3$ and $R_2$ at one end, and at the other end thereof to the base of transistor 82. The reed switch 280 is operable in response to an externally applied magnetic field, such as for example from a magnet (not shown) to close its contacts. The switch 280 may be either bistable or monostable such that the magnet when applied is effective to switch it between bistable states according to how the magnet is applied or to hold the contacts of switch 280 closed only if the magnet is held adjacent thereto. As indicated by the dashed conductor 290, (see FIG. 4) switch 280 may be optionally connected to terminal 18, as for example when the power supply 12 of the invention is being utilized independently of the present pacer electronics 14 or when it is desirable to operate the pacer electronics 14 in the demand mode.

Operation of the switch 280 will cause transistor $Q_{82}$ to go into conduction thus preventing the reset of the timing circuit in the pacer electronics. This means that the pacer will be operating in the fixed rate mode and the output rate of the pacer is dependent upon the voltage available on terminals 18-16 from power source 12. Operation of the reed switch 280 causes the voltage across base terminal of transistor $Q_1$ to be substantially less than the reference level $V_{be}$ of transistor $Q_1$; transistor $Q_1$, therefore, becomes non-conducting while transistor $Q_2$ goes to full conduction thus allowing transistor $Q_3$ to be fully saturated. This places all the cells within the power source in series. It can therefore be seen that switch 280 comprises a selectively actuable means for serially interconnecting the batteries 22 and 31 and that such serial interconnection can be effected irrespective of the voltage across the output terminals 18-16. Operation of switch 280 will provide a voltage between terminals 18-16 equal to four times the normal voltage of each cell. However, when switch 280 is closed doubling the voltage at the terminals 16 and 18, the design of the pulse generating circuit 72 produces a sufficient voltage dependency in its pulse rate to greatly increase the rate, according to curve 154 in FIG. 2. As indicated in my above-referenced application Ser. No. 78,659, this voltage dependency is produced by a cooperation between the reference level established by resistors 108 and 114 and the forward voltage turn-on of the transistor 100. The pulse width is also voltage dependent, and it varies according to the curve 156 indicated in FIG. 2 as well.

The switch 280 can also be activated to apply the batteries in series across the terminals 16 and 18 in the event that it is wished to detect the condition of the batteries or the individual cells therein. This is to be normally accomplished by use of a magnet to close the contacts of switch 280. By detecting the pulse width and pulse rate by electrocardiogram means and cathode ray tube means, it is possible to determine the general condition of the four cells in the batteries 22 and 31 in conjunction with the curves of FIG. 2. In particular, Table I below indicates exemplary observed pulse rates and the possible battery conditions that can result therefrom with and without the diodes 24a–34a. It is also possible to utilize the interval between the natural and artificial pacer pulse to determine battery conditions so long as the natural rhythm is not of the continuous nature whereby the pulse generator is continuously inhibited.

TABLE I

| Failure MODE | Parallel Rate | BATTERIES Series Rate With Diodes | Series Rate Without Diodes |
|---|---|---|---|
| 1 cell open | 69 | 78 | 69 |
| 1 cell shorted | 69 | 78 | 78 |
| 2 cells open in same battery | 69 | 69 | 69 |
| 2 cells open in different batteries | 62 | 69 | 0 |
| 2 cells shorted in same battery | 69 | 69 | 69 |
| 2 cells shorted in different batteries | 62 | 69 | 69 |
| No cell failure | 69 | 82 | 82 |

These exemplary conditions of the several ways in which battery failure can occur provide an indication of how rate and width information can be used to gain insight into the condition of the battery. It is to be noted that a different set of rates results from all six types of failure, but that pacer operation can be maintained in all failure modes for up to 50 percent of the batteries. As a result it is possible to evaluate the criticality of the battery failure and repredict when the batteries should be replaced.

In a further feature of the power source according to the invention and when no or only one battery failure has occurred, it might be desirable to activate switch 28 to close its contacts and cause the conditions indicated in the first two or last lines of Table I with an increased pulse rate, and an increased stimulating pulse amplitude as well as width. The increased rate is useful to prevent premature ventricular contraction while the increased amplitude and pulse width are useful where a substantial increase in threshold to artificial pulsing has occurred requiring a higher voltage pulse in order to cause artificial ventricular contraction. This increase in threshold might occur from a dislodging of the electrode 52 which is normally lodged in the right ventricle.

Likewise the pulse width information can be used separately for battery status determination or as a confirming parameter.

Figure 3:
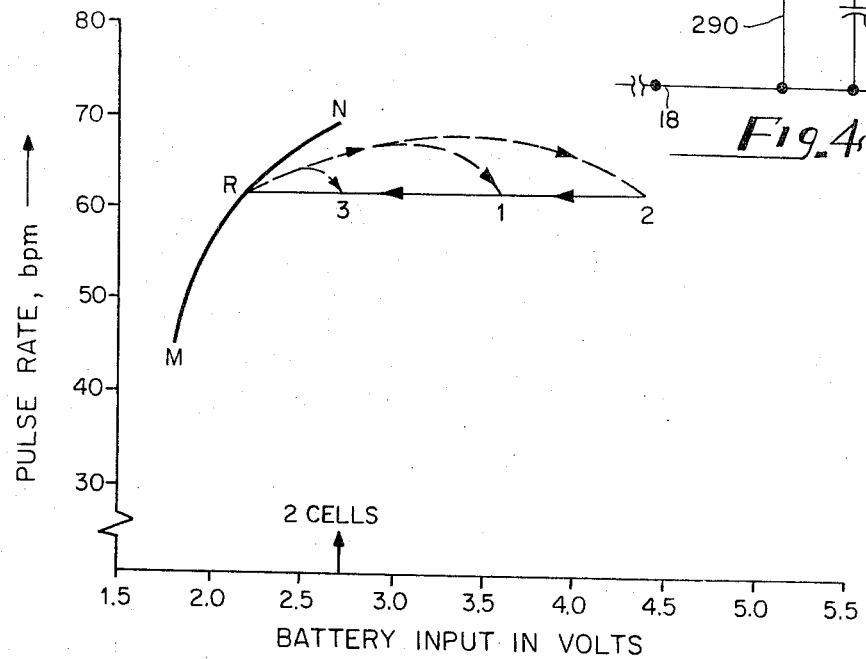

The full significance of the automatic regulating loop described above can be better appreciated by referring to the pacer operating characteristics shown in FIG. 3. The different modes of operation are as follows:

1. Mode I Failure — both sets of battery E34-32 and E26-24 operating in the energy depletion mode;
2. Mode II Failure — E34, or E32 failed; E26-24 in depletion;
3. Mode III Failure — E26, or E24 failed; E34-32 in depletion; and
4. Mode IV Failure — one cell failed in each of the sets E26-24 and E34-32.

Referring now to FIG. 3 and to a Mode I Failure, the initial rate is 69 bpm with the pacer operating at point N since the terminal voltage at output terminals 18-16 corresponds to two cells. As the energy on both sets of cells depletes, the voltage begins to drop and the pacer rate falls along the curve N--R when the voltage regulator circuit becomes operative connecting all four cells in series. The operating point immediately proceeds to point 2 (as indicated by the dotted curve), where the corresponding battery voltage is approximately 4.4 volts. The pacer rate is however maintained at 62 bpm corresponding to the regulated voltage of 2.2 volts across terminal 18 and 16. This rate will be maintained until the series source voltage drops to about 2.2 volts as shown by the retrace of the operating point from 2 to R in the solid line, and hence continue to drop in rate toward M. The rate drop from N to R is already a sufficient indication for pacer replacement. Should this be missed between periods of checking, the pacer will remain operating at this rate until all the energy is drawn from the strongest of the remaining cells, thus extending the useful life of the pacer as well as providing ample warning time for pacer replacement.

In the Mode II and III failures, the operating sequence is still from N to R whereupon it suddenly traverses to point 1 and returns to R and M. This means three batteries are connected in series with the output across terminals 18-16 being maintained at 2.2 volts. Under this assumption, the remaining cell on the failed pair has the greatest energy remaining. This cell together with the strongest cell in the other stack will sustain pacer operation until the unit is replaced.

In a Mode IV failure, pacer function cannot be maintained upon a single cell failure in each pair without the regulating circuit of the present invention. This arises from each or both of the following causes:

a. The voltage is too low to maintain oscillator function in the pacer, and
b. The output of the pacer is not sufficient to maintain ventricular capture.

With the regulating loop, a sudden drop in voltage on terminal 18-16 to 1.37 volts will be recognized and the cells in the two pairs will be automatically connected in series, and the terminal voltage will be maintained at 2.2 volts. In this mode of failure, the operating characteristic suddenly traverses from N to R and then to point 3 where it will remain until the voltage on the 2 series cells begins to fall. The pacer output rate will remain constant until the combined source voltage drops below 2.2 volts. The regulating circuit of the invention will thus maintain pacer function independent of the mode of cell failure taken two at a time in any sequence. The pacer will function until the third cell begins to deplete, thus providing adequate warning time for pacemaker replacement.

Having described above a preferred embodiment according to the invention, it will occur to those skilled in the art that various modifications and alternatives can be generated without departing from the spirit of the invention. It is accordingly intended to limit the scope of the invention only as indicated in the following claims.

I claim:

1. In a power supply having a pair of power output terminals, the power supply being connectable to the power input terminals of a body organ stimulating device, the power supply further comprising at least two voltage sources connected in parallel, each voltage source being connected to the power output terminals and having substantially the same initial terminal voltage whereby initially the power output terminals of the power supply are supplied with a voltage substantially equal to the terminal voltage appearing across each voltage source of the power supply, the improvement comprising: voltage regulating means operatively connected to the power output terminals of the power supply and to each voltage source thereof and being responsive to the voltage appearing across the output terminals of the power supply falling to a predetermined value less than the initial terminal voltage of the voltage sources for automatically serially interconnecting each of the voltage sources and the power output terminals of the power supply, and for maintaining the voltage across the power output terminals of the power supply substantially equal to the predetermined value.

2. In a power supply as defined in claim 1 wherein the voltage regulating means includes:

a. means having a variable impedance interconnecting each of the voltage sources of the power supply and when activated providing a series connection between the voltage sources and the power output terminals of the power supply with the voltage appearing across the power output terminals in such series configuration being substantially equal to the sum of the voltages appearing across each of the voltage sources of the power supply minus the voltage drop across the means having a variable impedance;

b. voltage sensing means operatively connected to the power output terminals of the power supply and to the means having a variable impedance for continuously sensing the voltage across the power output terminals of the power supply and being responsive to the voltage across the power output terminals of the power supply falling to a predetermined value for activating and continuously varying the impedance of the means having a variable impedance thereby maintaining the voltage across the power output terminals at the predetermined level;

and c. means for rendering ineffective the parallel connection of the voltage sources when a series connection thereof is effected.

3. In a power supply as defined in claim 1 including selectively actuable means operatively connected to the voltage regulating means for controlling the operation thereof and for causing it to effect a series interconnection of the voltage sources and the power output terminals of the power supply irrespective of the voltage appearing across the power output terminals of the power supply.

4. In a cardiac pacer having a voltage responsive, variable rate pulse generator a redundant power supply comprising:
   a. a pair of power output terminals;
   b. a first voltage source coupled to the pair of power output terminals;
   c. a second voltage source coupled to the pair of power output terminals and connected in parallel with the first voltage source, the first and second voltage sources initially supplying a voltage to the pair of power output terminals substantially equal to the terminal voltages thereof; and
   d. voltage regulating means coupled to the pair of power output terminals for maintaining the voltage across the pair of power output terminals at a predetermined substantially constant value less than the initial terminal voltages of the first and second voltage sources in response to the voltage appearing across the pair of power output terminals falling to the predetermined value, the voltage regulating means comprising;
      i. means having a variable impedance interconnecting the first and second voltage sources and when activated providing a series connection between the first and second voltage sources and the pair of power output terminals, with the voltage appearing across the pair of power output terminals in such series configuration being substantially equal to the sum of the voltages appearing across each of the first and second voltage sources minus the voltage drop across the means having a variable impedance;
      ii. voltage sensing means coupled to the pair of power output terminals and to the means having a variable impedance for continuously sensing the voltage across the pair of output terminals and for activating and continuously varying the impedance of the means having a variable impedance when the voltage across the pair of power output terminals falls to the predetermined value thereby maintaining the voltage across the pair of power output terminals at the predetermined level; and
   c. means for rendering ineffective the parallel connection of the voltage sources when a series connection thereof is effected.

5. In a cardiac pacer as defined in claim 4 including:
   a. selectively actuable means operatively connected to the voltage regulating means for controlling the operation thereof and for causing the voltage regulating means to interconnect the first and second voltage sources and the pair of power output terminals of the power supply in series irrespective of the voltage appearing across the power output terminals and for simultaneously causing the pulse providing means to operate at a continuous rate.

6. A cardiac pacer having the redundant power supply of claim 5 further including a diode connected across each voltage source of the power supply to provide conduction by-passing a voltage source in the event of open circuit failure thereof and to provide a shunt for reverse polarization of a voltage source.

7. In a cardiac pacer as defined in claim 4 including:
   a. selectively actuable means operatively connected to the voltage regulating means for controlling the operation thereof and for causing the voltage regulating means to interconnect the first and second voltage sources and the pair of power output terminals of the power supply in series irrespective of the voltage across the power output terminals and for simultaneously causing the pulse providing means to operate in a continuous mode, the timing by an observer of pulses generated by the pulse providing means providing an indication to the observer of the voltage across the power output terminals when the voltage sources and pair of power output terminals are connected in series.

* * * * *